March 22, 1960  W. H. CARTER, JR  2,929,992
PULSE TACHOMETER
Filed Sept. 25, 1956  2 Sheets-Sheet 2
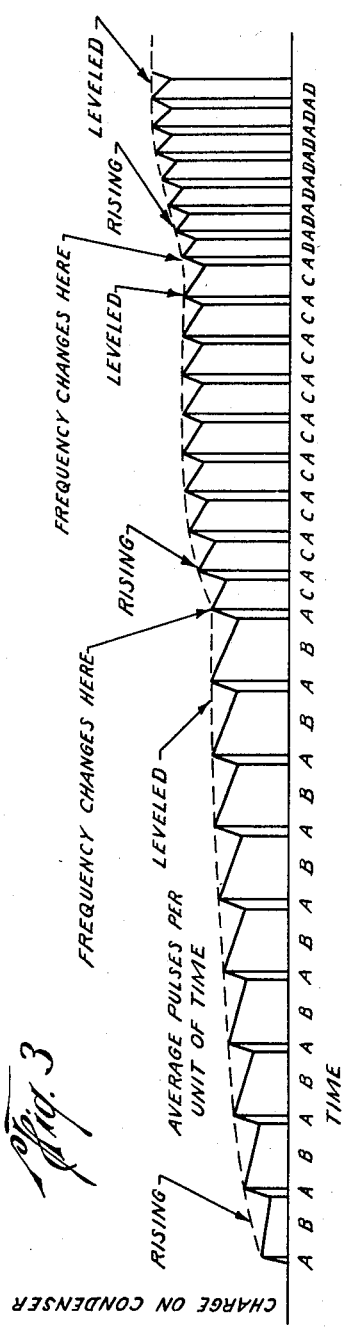
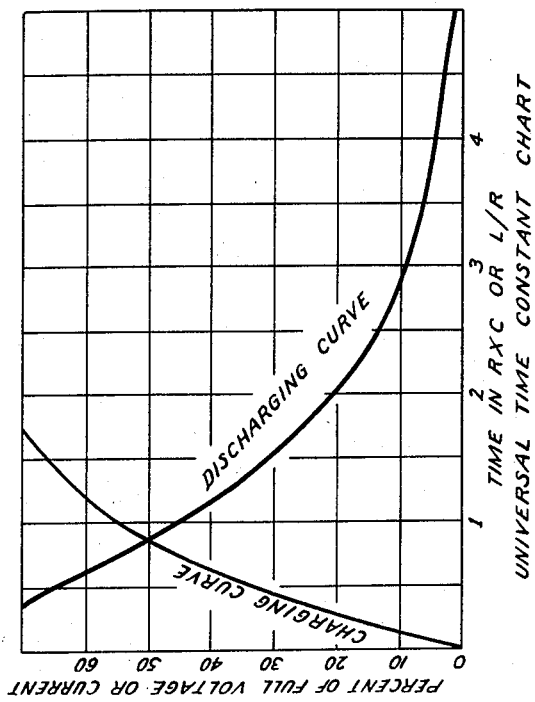
William H. Carter, Jr.
INVENTOR.
BY Wm. E. Ford
ATTORNEY

United States Patent Office 2,929,992
Patented Mar. 22, 1960

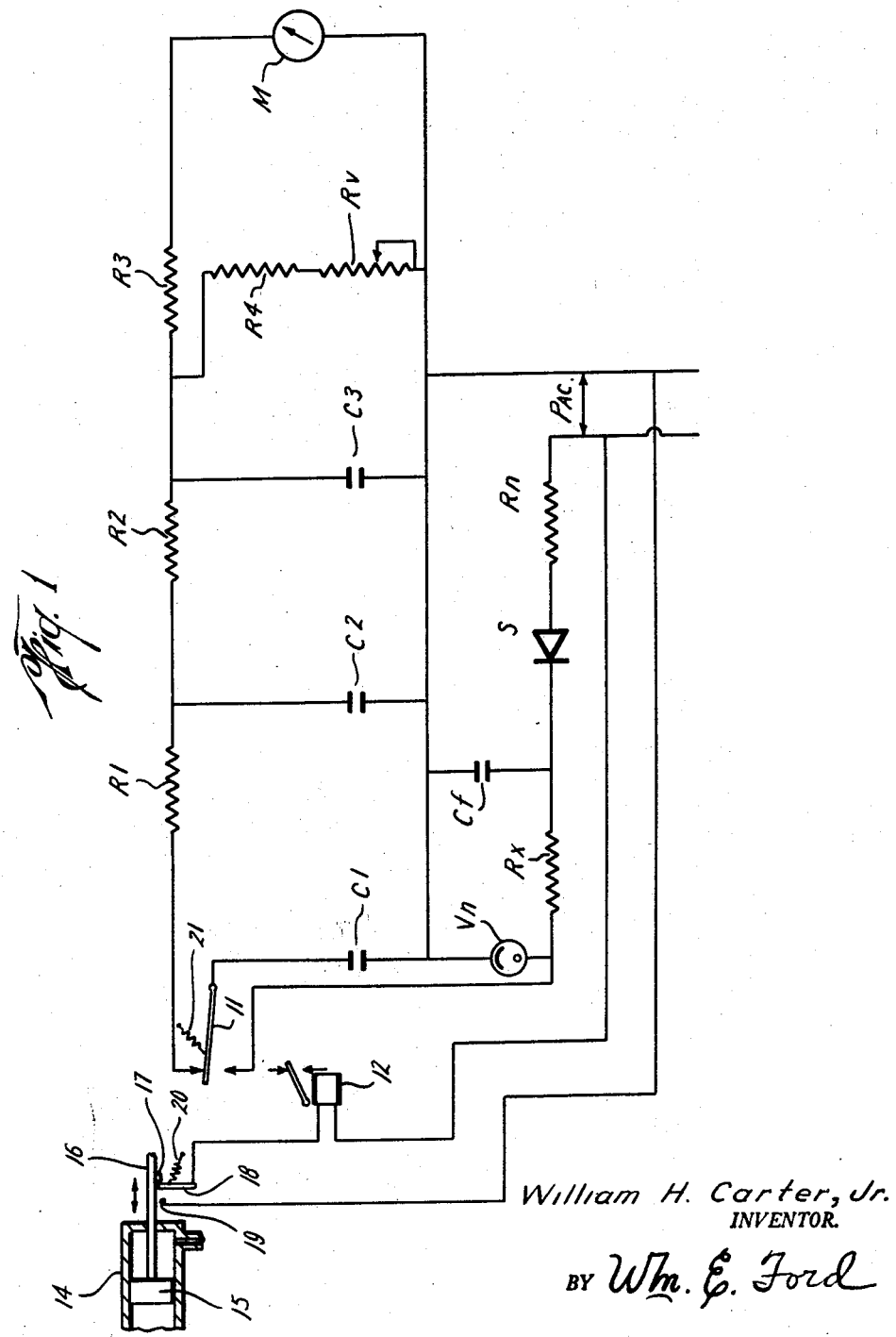

2,929,992

PULSE TACHOMETER

William H. Carter, Jr., Houston, Tex.

Application September 25, 1956, Serial No. 611,969

2 Claims. (Cl. 324—70)

This invention relates to a pulse tachometer or related devices adapted to convert reciprocatory excursions or pulsations into linearly readable measurements, translated into a figure indicating rate of impulses, excursions, or pulsations per unit of time. Such a tachometer being employable as in the measuring of the rate of impulses of a mechanism employed in carrying out cyclic operations of varying time intervals, there being no steady reliable element, such as a shaft on which such measurement can be made by means of a conventional tachometer.

It is consequently a primary object of this invention to provide a pulse tachometer or indicating device for measuring the average of such reciprocal pulses occurring per unit of time. The indication of such a tachometer would therefore be the average number of excursions of a moving part over a fixed interval of time, averaged during such fixed interval of time. The indicating meter of this invention therefore does not indicate the total number of excursions, but rather, the statistical average of the number of the excursions occurring during a pre-determined relatively long fixed, interval of time immediately preceding the instantaneous meter reading. It would therefore read excursions per unit time. The figure would be the statistical average of the total number of pulses per minute which occurred over the immediate previous five or ten minute time interval.

It is a particular object of this invention to provide a tachometer of this class which is adapted to measure the strokes of a reciprocatory pump as in reciprocations per minute in which the rate of these reciprocations may vary in substantial degree, a meter being included in this device, and being so connected as to give an accurate instantaneous indication, in a linear reading, of such average rates of reciprocations based on information provided over a relatively long time base.

It is another object of this invention to provide an electrical A.C. tachometer of this class which arrives at such linear readings by an arrangement of successive resistors and condensors between the input circuit and indicating meter, whereby the time constants of such successive condensors, charging and discharging, are relatively long compared to the time of each event measured.

Other and further objects will be apparent when the herein specification is concerned in connection with the drawings in which:

Fig. 1 shows an electrical diagram of the circuits of the invention; and

Fig. 2 is a plotted curve indicative of the invention in which time in seconds, as abscissa, is plotted against pulsations per minute as ordinate.

Referring now to Fig. 1, there is shown a source of alternating current $Pac$, and the side of the line of such source contains therein a resistance $Rn$ and a selenium rectifier S for converting A.C. current into D.C. current, the resistance $Rn$ limiting the current flowing into the rectifier S. This side of the line has therefore circuits including a switch 11 actuated by a relay 12 to be hereinafter described, which throws the switch 11 and connects a condenser C1 in the charging position opposite the position shown in Fig. 1, also to be hereinafter described.

In this position, this side of the line contains two (2) parallel circuits, one containing therein a filter condenser $Cf$ for the purpose of attenuating voltage, regardless of variations in line voltage, and the other comprising a resistance $Rx$, and in series therewith, two (2) parallel circuits, one containing therein a voltage regulator $Vn$ for holding the converted D.C. voltage constant, and the other containing therein a low capacity condenser C1.

Thus, the rectifier S, the resistance $Rn$, together with a condenser $Cf$ and a resistance $Rx$, together constitute a conventional rectifier circuit which changes the A.C. voltage $Pac$ to D.C. voltage, which is impressed across the voltage regulator $Vn$, such being a conventional gas type voltage regulator tube which causes the voltage supplied by the rectifier system to remain essentially constant at say approximately 100 volts.

When relay 12 is energized, switch arm 11 is pulled into position so that C1 is connected across $Vn$ momentarily, or as long as the coil of the relay 12 is energized. C1 is chosen of low capacity, as say one microfarad, so that it immediately charges to a value of say 100 volts when connected across $Vn$. The value of C1 must be of this low capacity relatively speaking, so that regardless of how fast switch 11 connects and disconnects C1 across $Vn$, a full charge will always be received by C1.

While the condenser C1 is being charged, the circuitry of the invention provides in circuit with such hereinabove described circuitry, but functionally separate therefrom, four (4) parallel circuits, one containing a condenser C2 of substantially larger capacity than the condenser C1, say of a capacity of 1,000 microfarads and 6 volt rating, and in series with such condenser C1 a substantial resistance R2 of say 4,300 ohms; another containing therein a condenser C3 of substantially the same capacity and rating as the condenser C2; another having therein a resistance R4 of say 2,700 ohms and in series therewith a variable resistance $Rv$ of say 2,500 ohms maximum; and still another having therein a resistance R3 of say 1,700 ohms and in series therewith a meter M, say a 100 microampere meter calibrated linearly from 0 to 100 or otherwise suitably calibrated.

The device hereinabove described is adapted to measure reciprocatory motion in terms of reciprocations per time interval as reciprocations per second or per minute. A specific application of this invention can be a reciprocating pump such as the pumps which are employed in pumping circulating fluid or "drilling mud" in oil wells. Such a pump cylinder 14 is shown in Fig. 1 having operative therein a piston 15, the rod 16 of which having a lug or cam 17 thereon which on delivery stroke comes in contact with a switch arm 18 to move it forward to close against a contact 19 which closes circuit to the relay 12 to actuate it to throw the switch 11 from the position shown in Fig. 1 to close contact to charge the condenser C1. Then on the return stroke, a spring 20 connected to the switch arm 18 withdraws it from contact 19 and breaks circuit to the relay 12, and when the relay 12 is de-energized a spring 21 returns it to the position shown in Fig. 1.

With the condenser C1 charged and thereafter, when the operation of the relay 12 throws the switch 11 to position to permit discharge of the condenser C1, another circuit is thrown in parallel with the condenser C2 which has therein the condenser C1, and a resistance R1 of say 1,000 ohms and consequently, of substantially less ohmic value than the resistance R2.

C1 then discharges into C2 through R1 at the same time C1 and C2 also discharge into C3 through R1 and R2. Since each individual charge accumulated in C1 is identical, the charge accumulated by C2 and C3 must necessarily, be a function of the movement of pulses which have been dumped by C1 into C2 and C3. If the varying number of pulses were to be impressed directly on the indicating meter M, that meter would try to follow immediately the variations of each pulse, and a very erratic or jittery indication would be observed. In order to smooth out the statistical variations, the electrical impulses are impressed on condensers C2 and C3. The charge on each of the condensers increases as more pulses are impressed upon it. The potential or voltage across the condenser will likewise increase as the rate increases. However, as the voltage across the condenser increases, the rate increases, at which the then accumulated charges are dissipated through R4, Rv, R3, and the resistance through M. When the rate of charge passing from C1 through R1 and R2 to be impressed on C2 and C3 is equal to the rate of discharge through R4, Rv, R3 and M, the meter will indicate a balance between the charges lost by the condensers through the calibration network of R4, Rv, and the energy supplied by C1.

Circuit constants are chosen to minimize the fluctuation within the range desired, such as 100 excursions per minute or one excursion per second. Meter M in series with resistance R3 constitutes a voltmeter which, when properly calibrated, reads the voltage across condenser C3 which is directly proportional to the rate at which C3 is being charged by C1, C2 through R1 and R2. Resistance R4 and Rv constitute a calibrating or adjusting network for adjudging the scale of meter M so that the condition of the charge on C3 will be indicative of the actual number of times, per minute or per second, that C1 dumps its measured charge into the integrating network.

Integration, by the use of resistors and condensers, is not new or novel and is quite frequently used for measuring frequency in connection with vacuum tubes and pulse equalizers. Therefore, this general method of integration is acceptable standard practice, but in this invention particular novelty resides in the application and method of charging and discharging C1 in order to secure uniform pulse amplitude and uniform measured units of electrical energy so that the number of times that switch 11 opens and closes will be directly proportional to the voltage level across C3. In this application it is not necessary that switch 11 should open and close at equally spaced intervals, but rather, it may operate in an erratic, random, or statistical manner and the answers on meter M will still be the average number of pulses occurring per unit of time.

Upon increase in the number of times condenser C1 is charged per unit time interval, the faster the condenser C2 is charged. However, this condenser can only be charged at a rate determined by the "time constant" of R1 in megohms multiplied by C2 in microfarads, other circuits and conditions not considered. Thus with R1 constituting a resistance of 1000 ohms or .001 megohm, and with C2 having a capacity of 1000 microfarads, the time constant therefor is equal to $.001 \times 1,000 = 1$ second.

On the other hand the faster the condenser C2 is charged, the faster the condenser C3 is charged. However this condenser, in turn, can only be charged at a rate determined by the "time constant" of R2 in megohms multiplied by C2 in microfarads. Thus with a resistance of 4300 ohms or .0043 megohm in R2, and with C3 having a capacity of 1,000 microfarads, the time constant therefor is equal to $.001 \times 4300 = 4.3$ seconds.

If the current from the discharge of the condenser C1 alone could flow to the circuits R3M and the parallel circuit of R4Rv then the needle of the meter M would rotate to full recording each time the condenser C1 discharges and return to zero each time thereafter as it charges and there would be continuous rapid oscillation of the meter needle and it would be impossible to obtain a reading in pulsations per minute.

However, in the circuitry of this invention the needle can never recede to zero position because in every cycle of circuit operation during the period of a pulsation, there is a part of such period during which the condenser C3 is discharging current to flow through the meter M and causing the needle to rotate toward the maximum reading position. Also there is generally a portion of such part of each pulsation period when the discharge current from the condenser C2 is additive with the discharge current flowing from the condenser C3 to the meter.

Since the greater the number of times C1 is charged per unit time interval the faster C2 is charged, it thus follows that the faster C2 is charged, the faster C3 will be charged and the longer part of each pulsation period discharge current will flow to the meter. But consider a reversal of these time constants in an arrangement whereby the time constant for R2, C3 is less than the time constant for R1, C2 and it can be seen that a condition could easily exist whereby during the lengthy period required to charge R1, C2 the condenser C3 could completely discharge through R2 to the meter M and the resistance circuit in parallel therewith, so that the needle could recede substantially or all the way to zero before the resumption of current flow thereto following the charging of C2.

In elaboration it can be stated that C1 charges almost instantaneously and thereafter R1 limits the time required to charge C2. In a like manner R2 limits the time required to charge C3. Because R2 is greater than R1, C2 comes nearer to being fully charged before current flow leaks away to pass through R2 to charge C3. During the period C3 is being charged the resistance R3 in the meter circuit, and the resistances R4, Rv in parallel therewith resist the flow of current therethrough. However, when the charge on C3 is equal to the charge on C2, C3 starts discharging through the circuits R3, M and R4, R2 and at this point the needle of the meter M, which has been receding, will swing in direction to indicate a reading corresponding with the actual pulsations per minute of the pump 14.

Reference may now be had to the drawing in which Fig. 2 duplicates the universal time constant chart, the theory thereof being fully set forth in Radar Electronics Fundamentals, Warships 900,016, Bureau of Ships, Navy Department, Washington, D.C., June 1944. This curve employs as ordinate the percent of full voltage or current at which a condenser may be charged or discharged. Now, referring to Fig. 3, the charge on condenser C2 and the discharge therefrom into condenser C3 are plotted as ordinates, together with average meter needle reading, against time as abscissa.

At beginning an initial charge is impressed on condenser C2 by condenser C1 in time interval A. For illustration this charge is plotted against time and is a duplication of that part of the Universal Time Constant Chart, Fig. 2, in which the charging curve climbs from 0 to 5% of full voltage or current. After a charge is impressed on condenser C1 during a fixed interval of time it discharges during time interval B. The discharge curve for such discharge is taken from the Universal Time Constant Chart, Fig. 2, during which the discharge curve descends from the 5% charge ordinate over the period of time B required to complete the frequency or pulsation interval which is equal to time intervals A plus B.

For illustration at the termination of time interval B the condenser C2 has leaked off voltage or current down to 3% of full voltage or current. At this point the condenser C2 receives another charge from condenser C1 during time interval A and such charge is plotted as a reproduction of the charging curve of the Universal Time Constant Chart from 3% to say 7%. Then discharge follows and is plotted from the discharge curve from 7% down to 5% during time interval B.

In similar fashion, during successive pulsations, at a frequency equal to time intervals A+B, the condenser C2 receives charge and discharges along percentage patterns taken from the charging and discharge curves of the Universal Time Constant Chart until the rates of percentage change during charge and discharge are the same and a condition of equilibrium is reached.

During the time required for this condition to be achieved the needle of the meter M fluctuates, moving higher during charge and lower during discharge, and in each fluctuation moves to higher points of peak and fall off on the dial until equilibrium is reached and thereafter, while this equilibrium continues, the needle will fluctuate between the same points of peak and fall off.

This equilibrium continues until the pulsation frequency changes, so that the frequency interval is equal to charge interval A plus discharge interval C. In such case C is taken for illustration as a shorter interval than the previous discharge interval B as the pump 14 increases in reciprocations per minute or time interval. Accordingly there is a shorter discharge period so that the percentage fall off during discharge is less, and consequently the graduation between the percentage peaks reached at the end of successive charges is higher until leveling off at the second equilibrium shown in Fig. 3.

In like manner should the pulsation frequency change again to charge time A plus a still shorter discharge time D, the gradation in climbing to a new equilibrium will be still steeper and equilibrium will be achieved in a still shorter time as shown in Fig. 3.

Similar occurrences are taking place in the case of condenser C3 but since condenser C3 is charged and discharged over a great time constant, greater damping of meter movement is obtained as in effect the condenser C3 re-averages the pulsation rates from the condenser C2.

Thus the objects of the invention could be obtained in degree without the resistance R2 and the condenser C3 but the fluctuation in needle position would be much greater during each pulsation so that it would be extremely difficult for the human eye to read the needle movement between peak and fall off points. In effect although conditions may exist, as in large scale measurements, where a single integration step may suffice, it is obvious that cases will exist, as where the measurements must be indicated at small scale and in minutiae, which will require a second resistance and condenser to effect a second integration, or even a third or more sets of resistances and condensers in succession to effect further integrations.

Obviously the invention is not limited to the specific circuit and application shown but other circuits and applications of the invention are also included as such may fall within the broad spirit of the invention and within the broad scope of interpretation claimed and merited for the appended claims.

What is claimed is:

1. A pulse tachometer for continuously recording the rate of reciprocations, as of a reciprocating pump, said tachometer comprising a relay circuit including a limit switch opened and closed upon each reciprocation, an alternating current power circuit including means to rectify alternating to positive direct current, a filter condenser circuit to reduce attenuation of voltage variations, a voltage regulator circuit to hold constant the positive direct current voltage while line voltage may vary, a circuit having a low capacity condenser as the only electrically functional element therein, and chargeable in a uniform and very short time interval, a circuit having a low resistance as the only electrically functional element therein, a switch operable upon each reciprocal operation of said relay responsive to limit switch opening and closing upon each reciprocation alternately to place said low capacity condenser circuit in parallel with said voltage regulator circuit to be fully charged to the full value of said direct current voltage, and to place said low capacity condenser circuit in series with said low resistance circuit to discharge therethrough, said tachometer including circuit means having therein as the only electrically functional element a second condenser of higher capacity than said low capacity condenser to be charged sequentially after said low capacity condenser is charged and from the discharge from said low capacity condenser, circuit means having therein as the only electrically functional elements a second resistance of higher resistance than said low resistance and a third condenser also of higher capacity than said low capacity condenser and to be charged sequentially after said second condenser is charged and from the discharge of said second condenser through said second resistance and thereinto, said tachometer also including parallel circuits, one containing a third resistance and a micro-ammeter in series, and the other containing a fourth resistance and a variable resistance therein, said third condenser discharging through said meter and variable resistance circuits with current affecting movement of the micro-ammeter needle to integrate its movement to indicate responsive to an average of current in terms of the rate of reciprocation to be measured thus to maintain said needle reading at graduations calibrated to indicate reciprocations per time interval, the charge time constant of said low resistance and said second condenser being relatively lower than the charge time constant of said second resistance and said third condenser, said needle thereby hovering substantially at said indicated average calibrated reading with only an inappreciable fall-off during each reciprocation as said third condenser charges, thereby linearly indicating the integrated average rate of reciprocation over a time interval.

2. In a pulse tachometer for measuring the rate of pulsations of a reciprocatory device, the combination of a positive, direct current, constant smooth voltage circuit, a circuit having a low resistance as the only electrically functional element therein, a circuit having a low capacity condenser as the only electrically functional element therein and chargeable in a unifom and very short time interval, a two position switch adapted in one position to connect said constant voltage circuit to fully charge said low capacity condenser to the full value of said direct current voltage, and in the other position adapted to connect said low capacity condenser in series with said low resistance circuit to discharge through said low resistance, a relay circuit operable upon each pulsation of said reciprocatory device to shift said switch back and forth to effect said connections, a circuit having a higher capacity condenser as the only electrically functional element therein and connected to receive discharge from said low capacity condenser after it has been fully charged, such discharge passing through said low resistance whereby the average pulsation rate over the time constant of said low resistance and said higher capacity condenser is integrated, a resistance protected meter circuit and a meter calibrating circuit in parallel therewith each to receive discharge therethrough from said low and higher capacity condensers either cumulatively or from said condensers individually, whereby current integrated to average corresponding with the pulsation rate of said device is supplied to said meter circuit and the integrated average pulsation rate is linearly indicated by successive meter needle positions oscillatorily arrived at on the graduated disc of the meter.

References Cited in the file of this patent

UNITED STATES PATENTS

| 1,833,867 | Houck | Nov. 24, 1931 |
| 2,468,696 | Westberg | Apr. 26, 1949 |
| 2,473,542 | Philpott | June 21, 1949 |
| 2,522,139 | Schoenbaum | Sept. 12, 1950 |
| 2,607,528 | McWhirter | Aug. 19, 1952 |